(12) United States Patent
Eastman et al.

(10) Patent No.: US 7,941,620 B2
(45) Date of Patent: May 10, 2011

(54) DOUBLE-ALLOCATION DATA-REPLICATION SYSTEM

(75) Inventors: Justin P. Eastman, Tucson, AZ (US); John G. Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 11/224,426

(22) Filed: Sep. 12, 2005

(65) Prior Publication Data

US 2007/0061529 A1      Mar. 15, 2007

(51) Int. Cl.
*G06F 12/00*      (2006.01)
*G06F 13/00*      (2006.01)
*G06F 13/28*      (2006.01)

(52) U.S. Cl. .......... 711/162; 711/E12.001; 711/E12.002

(58) Field of Classification Search .................... 711/162
See application file for complete search history.

(56) References Cited

U.S. PATENT DOCUMENTS

| | | |
|---|---|---|
| 5,873,103 A | 2/1999 | Trede et al. |
| 5,983,239 A | 11/1999 | Cannon |
| 6,098,074 A | 8/2000 | Cannon et al. |
| 6,330,572 B1 | 12/2001 | Sitka |
| 6,775,676 B1 | 8/2004 | Briam et al. |
| 6,833,970 B2 | 12/2004 | Buckingham |
| 6,847,984 B1 | 1/2005 | Midgley et al. |
| 6,952,741 B1* | 10/2005 | Bartlett et al. ................. 709/245 |
| 7,130,924 B2* | 10/2006 | Bartlett et al. ................. 709/245 |
| 7,606,845 B2* | 10/2009 | Cannon et al. ......................... 1/1 |
| 2002/0078065 A1 | 6/2002 | Agulhon |
| 2003/0023609 A1* | 1/2003 | Della-Libera et al. ......... 707/101 |
| 2003/0086015 A1* | 5/2003 | Korhonen et al. .......... 348/423.1 |
| 2004/0260873 A1* | 12/2004 | Watanabe ...................... 711/114 |
| 2005/0071195 A1* | 3/2005 | Cassel et al. ....................... 705/2 |
| 2005/0271059 A1* | 12/2005 | Young et al. ................... 370/389 |

OTHER PUBLICATIONS http://web.archive.org/web/20040324231016/http://azureus.sourceforge.net/doc/Azureus+User+Guide.pdf, "Azureus User Guide," pdf created Dec. 24, 2003, web archive notes available Mar. 24, 2004. pp. 1-17.*
Gang Wu and Tzi-cker Chiueh. "Peer to Peer File Download and Streaming" Jun. 14, 2005, pp. 1-32.*

* cited by examiner

*Primary Examiner* — Matt Kim
*Assistant Examiner* — Matthew R Chrzanowski
(74) *Attorney, Agent, or Firm* — Quarles & Brady LLP

(57) ABSTRACT

A data-allocation data-replication system includes a controller adapted to respond to back-up requests from host systems by first allocating an accumulated data set containing multiple source data sets. An index data set is then allocated incorporating index keys and other information helpful to restore the source data sets, such as locations of individual source data sets within the accumulated data set.

18 Claims, 6 Drawing Sheets

DOUBLE-ALLOCATION DATA-REPLICATION SYSTEM

BACKGROUND OF THE INVENTION

1. Field of the Invention

This invention is related in general to the field of data management systems. In particular, the invention consists of a system for fast replication of multiple data sets using a double allocation process.

2. Description of the Prior Art

Data storage libraries are used for providing cost effective storage and retrieval of large quantities of data. In a data storage library, data is stored on data storage media. This data storage media may comprise any type of media on which data may be stored, including but not limited to magnetic media (such as magnetic tape or disks), optical media (such as optical tap or disks), electronic media (such as PROM, EEPROM, flash PROM, Compactflash™, Smartmedia™ Memory Stick™, etc.), or other like media.

Typically, the data stored in a data storage library are segregated into data sets. These data sets may comprise physical data storage device, such as one or more hard disk drives. Alternatively, the data sets may include virtual storage devices, such as one or more partitions residing on one or more physical hard disk drive. It is customary to make copies, i.e., back-up data to prevent loss or corruption. The process of backing up data usually requires significant allocation of the data storage libraries resources such as processor capacity and communication bandwidth. A large portion of this resource allocation is dedicated to setting up and managing the transfer of each data set. Because a set-up process is traditionally required for each and every data set to be transferred, the utilization of system resources is compounded when multiple data sets are to be backed up. Accordingly, it is desirable to have a system for making copies of multiple data sets that reduces the cumulative demand for system resources associated with setting up and managing the data transfer process.

One approach to improving the replication of data is disclosed by Midgley et al. in U.S. Pat. No. 6,847,984. Here, Midgley teaches a system and method for continuous back up of data stored on a computer network. To the end, Midgley utilizes a synchronization process that replicates selected source data files stored on the network and creates a corresponding set of replicated data files, referred to as target data files, that are stored on a back up server. This produces a baseline data structure of target data files. Additionally, the Midgley invention utilizes a plurality of agents to monitor a portion of the source data files to detect and capture changes to the source data files. However, the invention, as disclosed by Midgley, is a process for mirroring data from the source to the target and does not address reducing the system requirements (overhead) necessary to initiate and manage transfers of complete data sets. In fact, because Midgley's invention captures changes to the source data set at the byte level, the number of communication sessions initiated to transfer data to the target data set is much higher than envisioned by the instant invention.

Another approach to the replication of data sets is disclosed by Briam et al. in U.S. Pat. No. 6,775,676. Here, Briam teaches deferring dataset creation by first creating database objects at a computer connected to a data storage device. Initially, a command to create a database object is received. Next, a database object definition for the database object is recorded. When the database object is accessed, a dataset for the dataset object is created from its database object definition. However, as with the Midgley device, Briam does not address reducing the overhead required to establish communication channels and managing the transfer of multiple data sets.

Yet another approach to data replication is explored by Buckingham in U.S. Pat. No. 6,833,970. Here, Buckingham discloses a data reader that reads a medium holding user and non-user data that includes information relating to the user data. The reader includes a read head that generates a data signal comprising user and non-user data. The user data is arranged into plural sets interspersed with the on-user data that identifies the user data within the sets. Processing circuitry receives and processes the data signal and obtains the user data from the data signal by using the non-user data to identify the user data within the data signal. While Buckingham teaches reading both data and meta data without relying on separation markers placed on the data storage medium, Buckingham also does not teach reducing the processor and communication system overhead when copying multiple data sets. Accordingly, it is desirable to have a system for replicating multiple data sets while reducing the system requirements for initiating multiple communication sessions.

SUMMARY OF THE INVENTION

The invention disclosed herein utilizes a process of double allocation to create two allocation data sets that, in turn, aid in the replication of multiple source data sets. The first allocation data set, according to the invention, is an accumulated data set into which multiple source data sets are copied. The copying of the source data sets to the accumulated data set is a local transaction and does not require the use of the data storage library's primary communication network. An exemplary process of creating the accumulated data set may include the use of fast replication to quickly transfer source data sets, in sets of tracks of data, to the accumulated data set. By transferring the data in tracks, the use of processor resources is reduced. The second allocation data set is an index data set used to identify the source data sets which have been added to the accumulated data set and their locations within the accumulated data set.

Once the accumulated data set and its associated index data set have been created, the data storage library can make one or more copies of the included source data sets by simply initiating a single data transfer session. In this manner, the resource requirements and communication overhead are drastically reduced from the traditional method of initiating a transfer session for each data set. Because resource and communication allocation only occur for the accumulated data set and the index data set, an advantage is gained over the process wherein an allocation is required for each target data set.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of only allocating and using two data sets to combine and index multiple source data sets so as to reduce overhead while making backup copies of the source data sets. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
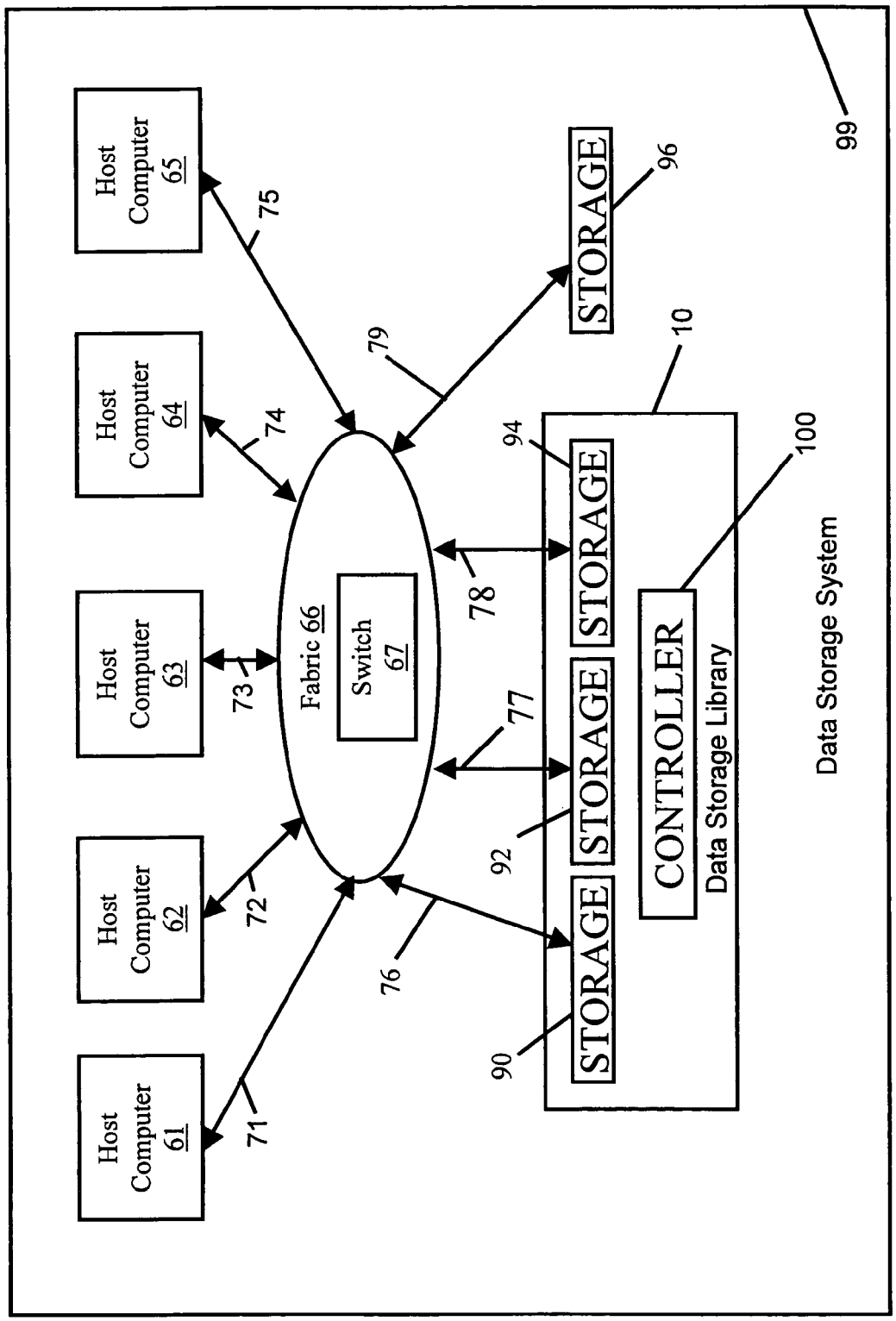
FIG. 1 is a block diagram illustrating a data storage system including a data storage library, according to the invention.

Referring to figures, wherein like parts are designated with the same reference numerals and symbols, FIG. 1 is a block diagram that illustrates aspects of an exemplary data storage system 99, according to one embodiment of the present invention. The data storage system 99 is designed as a switched-access-network, wherein switches 67 are used to create a switching fabric 66. In this embodiment of the invention, the data storage system 99 is implemented using Small Computer Systems Interface (SCSI) protocol running over a Fibre Channel ("FC") physical layer. However, the data storage system 99 could be implemented utilizing other protocols, such as Infiniband, FICON, TCP/IP, Ethernet, Gigabit Ethernet, or iSCSI. The switches 67 have the addresses of both the hosts 61, 62, 63, 64, 65 and storage units 90, 92, 94, 96.

Host computers 61, 62, 63, 64, 65 are connected to the fabric 66 utilizing I/O interfaces 71, 72, 73, 74, 75 respectively to fabric 66. I/O interfaces 71-75 may be any type of I/O interface; for example, a FC loop, a direct attachment to fabric 66 or one or more signal lines used by host computers 71-75 to transfer information respectfully to and from fabric 66. Fabric 66 includes, for example, one or more FC switches 67 used to connect two or more computer networks. In one embodiment, FC switch 67 is a conventional router switch.

Switch 67 interconnects host computers 61-65 to storage 90, 92, 94, and 96 across respective I/O interfaces 76-79. I/O interfaces 76-79 may be any type of I/O interface, for example, a Fibre Channel, Infiniband, Gigabit Ethernet, Ethernet, TCP/IP, iSCSI, SCSI I/O interface or one or more signal lines used by FC switch 67 to transfer information respectfully to and from storage 90, 92, 94, and 96. In the example shown in FIG. 1, storage 90, 92, and 94 are stored within data storage library 98, and storage 96 is network attached storage ("NAS").

Figure 2:
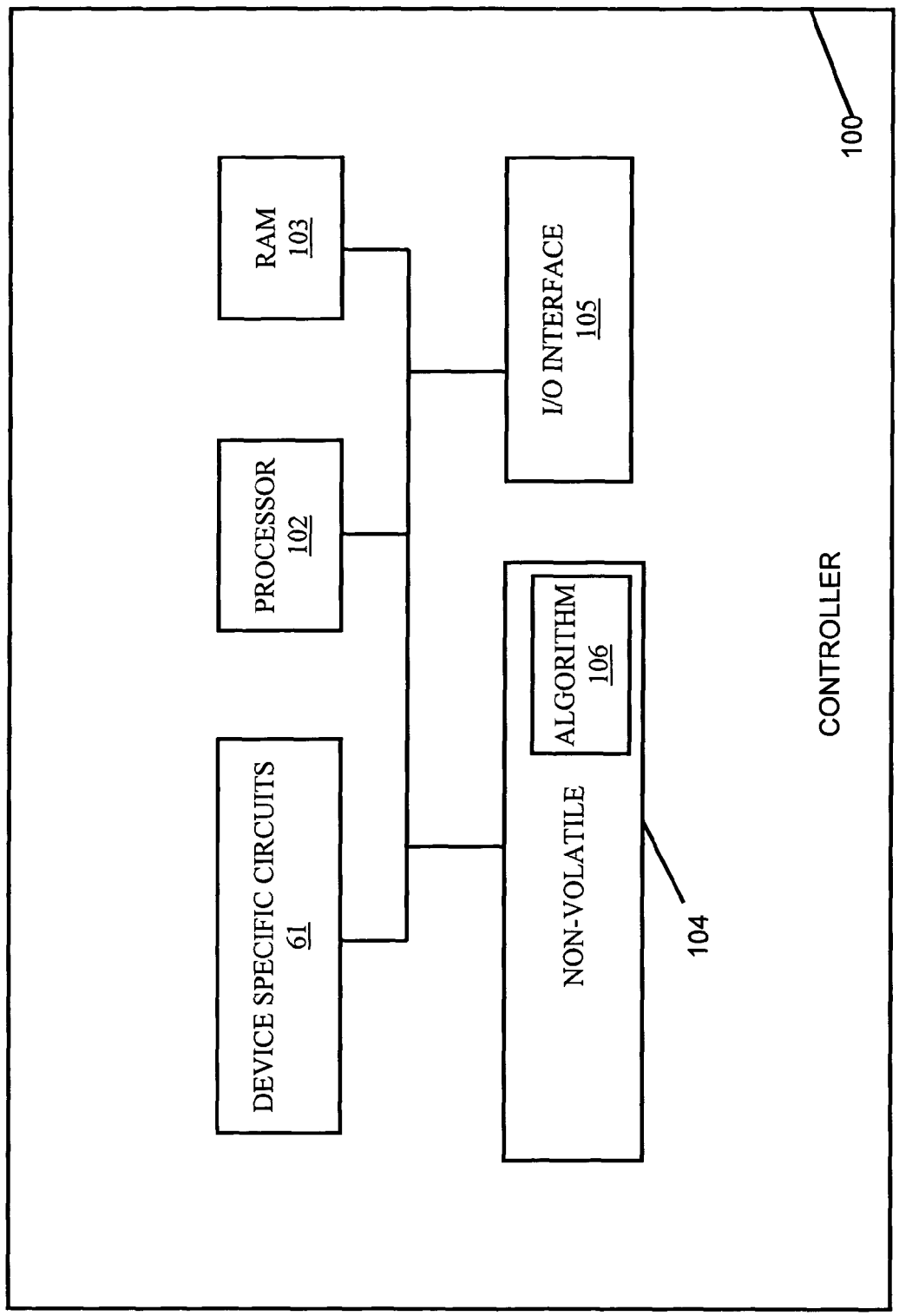
FIG. 2 is a block diagram of an exemplary data storage library controller, according to the invention.

A data storage library 10 typically includes one or more controllers 100 to direct the operation of the library. The controller may take many different forms and may include an embedded system, a distributed control system, a personal computer, workstation, etc. FIG. 2 shows a typical library controller 100 with a processor 102, random access memory ("RAM") 103, nonvolatile memory 104, device specific circuits 101, and an I/O interface 105. In one embodiment of the invention, the algorithm necessary to perform the invention is stored in the nonvolatile memory 104, thus creating an article of manufacture. Other embodiments of articles of manufacture may include programs written to floppy-disk drives or flash drives which may be accessed via the I/O interface 105.

Alternatively, the RAM 103 and/or nonvolatile memory 104 may be contained in the processor 102. Processor 102 may be an off-the-shelf microprocessor, a custom processor, an FPGA, an ASIC, or other form of discrete logic. RAM 103 is typically used to hold variable data, stack data, executable instructions, etc. The nonvolatile memory 104 may comprise any type of nonvolatile memory such as Electrically Erasable Programmable Read Only Memory ("EEPROM"), flash Programmable Read Only Memory ("PROM"), battery backup RAM, hard disk drive, or other similar device.

The nonvolatile memory 104 is typically used to hold executable firmware and any nonvolatile data. I/O interface 105 comprises a communication interface that allows processor 102 to communicate with devices external to the controller. Examples of I/O interface 105 include serial interfaces such as RS-232 or USB (Universal Serial Bus), SCSI (Small Computer Systems Interface), Fibre Channel, etc. In addition, I/O interface 105 may comprise a wireless interface such as radio frequency ("RF") or Infrared. The device specific circuits 101 provide additional hardware to enable the controller 100 to perform unique functions such as robotic control of an automated data storage system.

Figure 3:
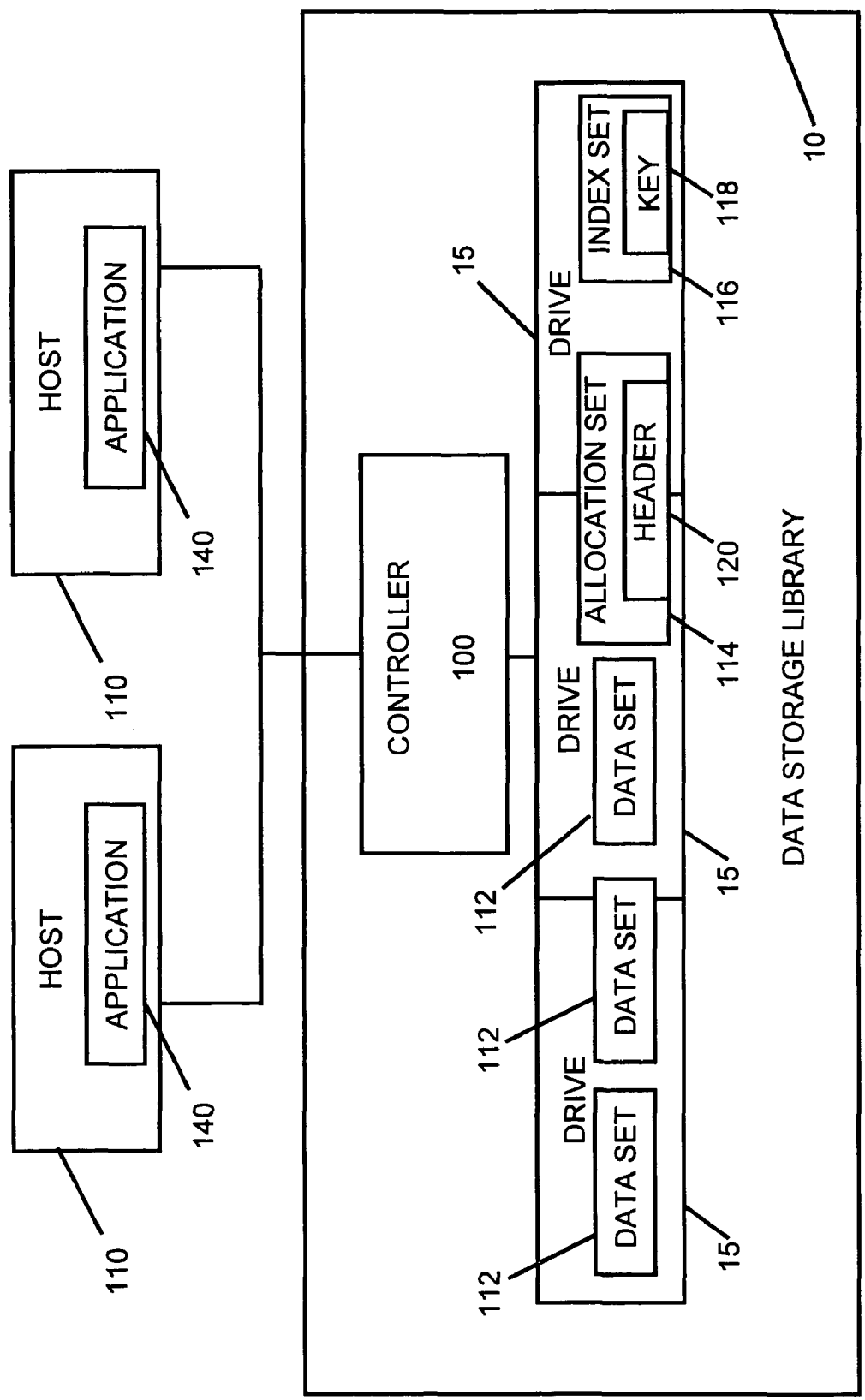
FIG. 3 is a block diagram of the data storage library of FIG. 1, implementing the invention.

FIG. 3 illustrates, in a block diagram, a computing environment in accordance with certain implementations of the invention. A data storage library 10 is coupled to one or more hosts 110. One or more application programs 140 run on each host 110 and may include algorithmic constructs for backing up data. The hosts 110 send requests to the library 10 to retrieve data from the drives 15. These requests may include requests to backup source data sets 112 from the drives 15.

Because backing up a data set in response to a request from a host 110 incurs significant processor overhead and significant communication bandwidth while establishing the data transfer session, one aspect of the invention is to combine several requests for backups into a single transaction. In this embodiment of the invention, the controller 100 receives one or more requests to backup data sets 112 from the hosts 110. In response, the controller 100 retrieves the desired data sets 112 from the drives 15 and combines them into an accumulated data set 114. Optionally, the accumulated data set 114 may include header information 120 including the number of tracks occupied by the accumulated data set 114. A record of each source data set 112 which is incorporated into the accumulated data set 114, as well as its starting and ending track or starting track and total number of tracks, is stored in the associated index data set 116. Other information necessary to restore the source data sets 112 may also be included in the index data set 116. Alternatively, this information may be included in the accumulated data set. Once the accumulated data set and index data set have been compiled, they are transmitted to the hosts 110. In this manner, only one communication session need be established for the transfer of multiple data sets. However, if the source data sets reside on different devices, multiple sessions may be required to transfer the data. A partially compiled accumulated data set and index data set may also be transmitted. This will still result in a reduction of processing time as multiple target data sets need not be allocated prior to receiving the partially compiled accumulated data set and index data set, even if only a single data set is included.

Figure 4:
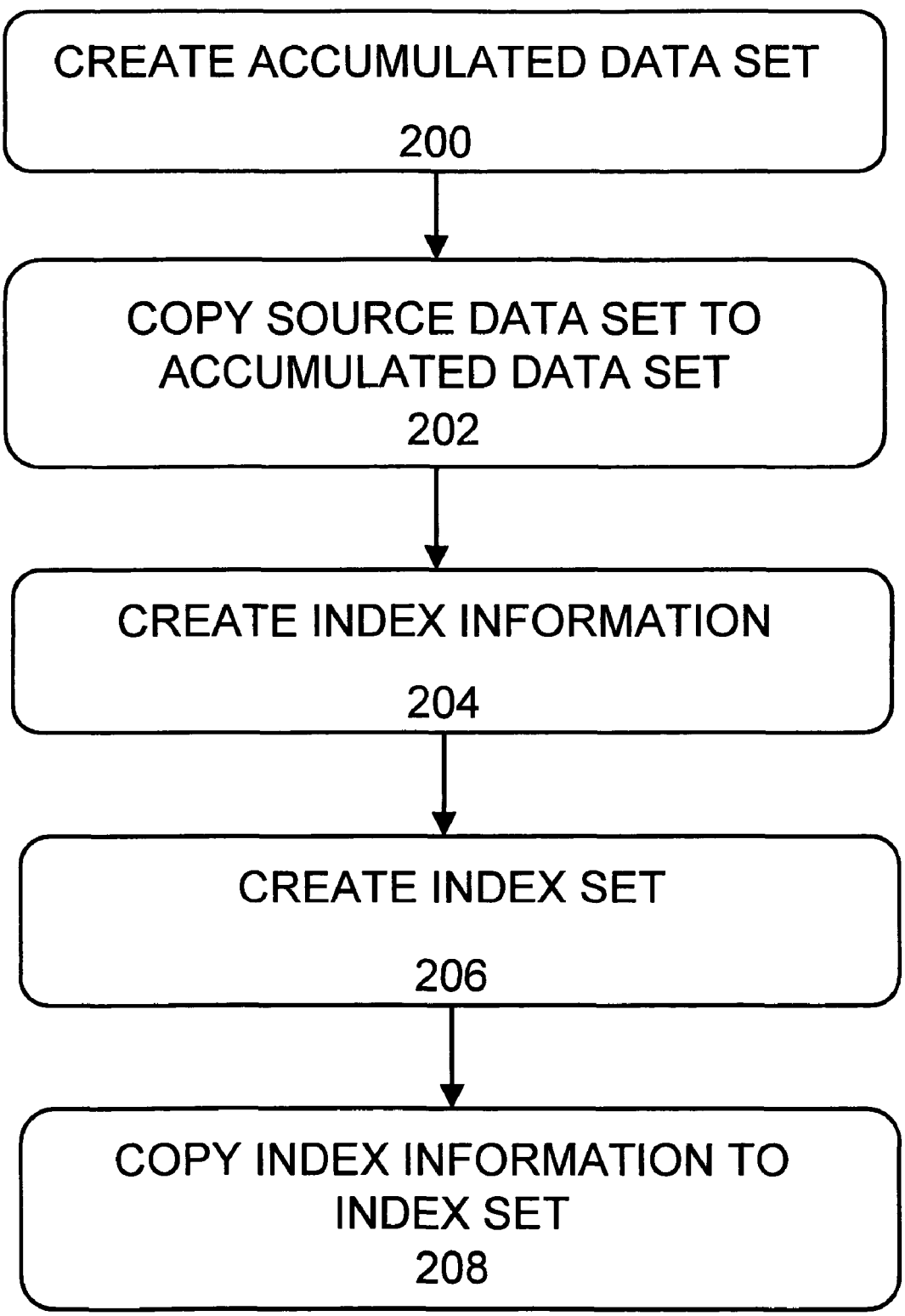
FIG. 4 is a flow chart illustrating the process of creating an accumulated data set and an index data set, according to the invention.

The process of backup up a source data set 112, according to the invention, is illustrated in the flow chart of FIG. 4. In step 200, an accumulated data set 114 is created by the controller 100. The source data set 112 is copied to the accumulated data set 114 in step 202. In step 204, index information is created by the processor. The index data set is created in step 206 and the index information is written to the index data set in step 208.

In step 202, header information may optionally be calculated and placed into either the accumulated data set or the index data set. In step 204, an index key 118 may be generated by the controller as part of the process of creating index information. This index key may be placed, in step 208, in the index data set 116 to aid in the restoration of the source data set 112 later. If more than one source data set 112 is to be written to the accumulated data set 114, the algorithm returns to step 200, else the accumulated data set is ready for transmission to host computers 110.

Figure 5:
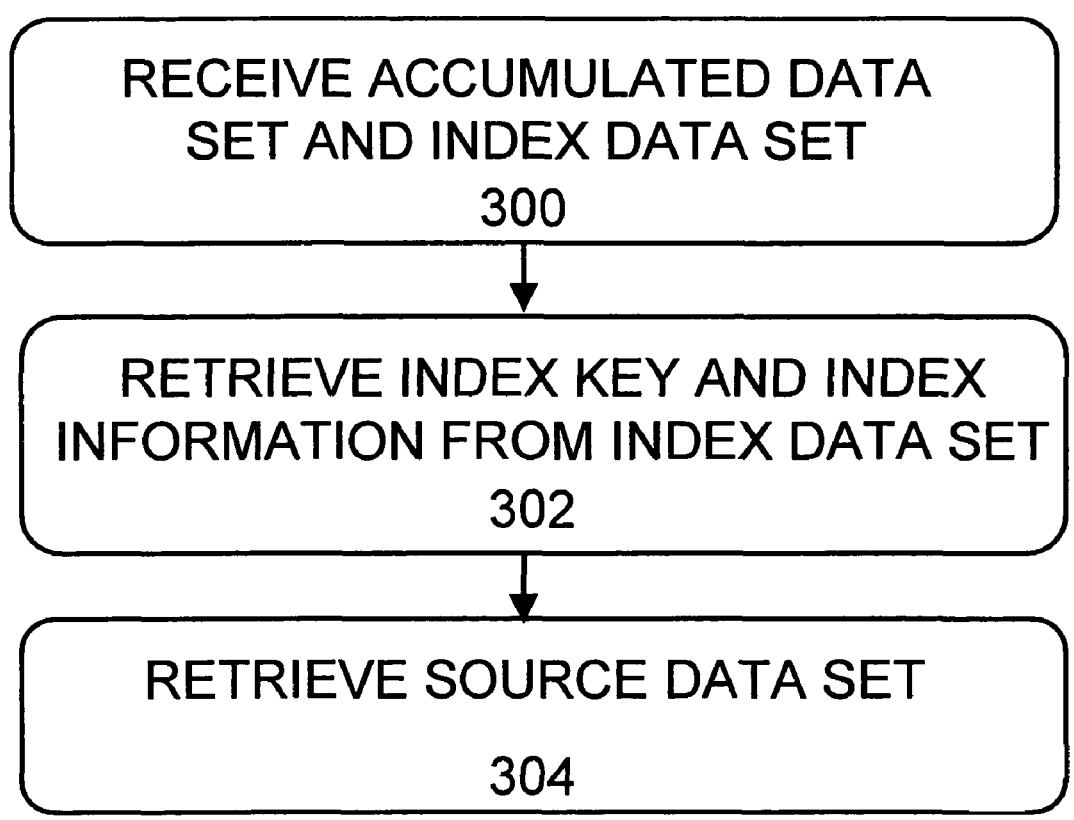
FIG. 5 is a flow chart illustrating the process of restoring a source data set from an accumulated data set utilizing an associated index data set, according to the invention.
Figure 6:
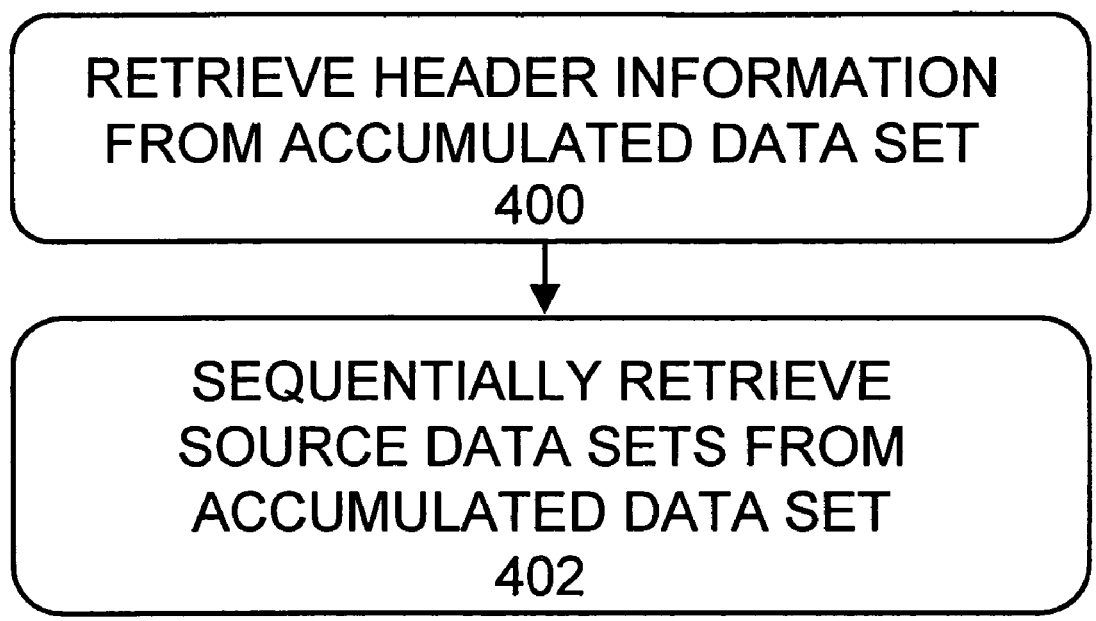
FIG. 6 is a flow chart illustrating the process of restoring a source data set utilizing header information within an accumulated data set, according to the invention.

Once an accumulated data set 114 and its associated index data set 116 have been received by a host 110, the requested source data set(s) 116 may be restored according to the algorithms illustrated by the flow charts of FIGS. 5 and 6. In FIG. 5, a source data set is to be restored using the index data set 116. In step 300, a host computer receives the accumulated data set 114 and the index data set 116 from the data storage library 10. In step 302, an application program 140 retrieves, from the index data set 116, the index key 118 and index information associated with the accumulated data set 114 corresponding to the desired source data set 112. Once the index key 118 and index information have been retrieved, the host application program 140 retrieves the desired source data set 112 from the accumulated data set in step 304.

In an optional embodiment of the invention, a host application program may retrieve a plurality of source data sets 112 from the accumulated data set 114 in a sequential manner, without using the index data set 116. As illustrated in the flow chart of FIG. 6, a host application program 140 may read header information from the accumulated data set 114 in step 400 and calculate a number of media tracks necessary to copy all the source data sets 112 in step 402. The calculated number of tracks are then copied from the accumulated data set 114 to the host 110 in step 404.

Those skilled in the art of data management systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A data replication system, comprising:
a data storage library having a plurality of source data sets;
a plurality of host computers;
a processor adapted to:
receive at least a first backup request from a first of said plurality of host computers and a second backup request from a second of said plurality of host computers, wherein said first backup request requests a first source data set to be backed up and said second backup request requests a second source data set to be backed up;
allocate an accumulated data set, and an index data set;
copy at least said first source data set and said second source data set to the accumulated data set such that the accumulated data set includes at least said first source data set and said second source data set;
calculate index information corresponding to the at least said first source data set and said second source data set copied to the accumulated data set;
write the index information to the index data set;
transmit the accumulated data set to at least said first of said plurality of host computers and said second of said plurality of host computers, such that each of said plurality of host computers requesting backup receives the entire accumulated data set; and
transmit the index data set to at least said first of said plurality of host computers and said second of said plurality of host computers such that each of said plurality of host computers requesting backup receives the entire index data set.

2. The data replication system of claim 1, wherein the processor is further adapted to calculate header information corresponding to the at least said first source data set and said second source data set that have been copied to the accumulated data set and to write the header information to the accumulated data set.

3. The data replication system of claim 2, wherein the header information comprises the number of tracks occupied by the accumulated data set in the data storage library.

4. The data replication system of claim 1, wherein the processor is further adapted to calculate an index key corresponding to the at least said first source data set and said second source data set that have been copied to the accumulated data set and to write the index key to the index data set.

5. The data replication system of claim 4, wherein the index data set includes the starting and ending track of each source data set included in the accumulated data set.

6. The data replication system of claim 1, wherein the processor is further adapted to copy at least said first source data set and said second source data set to the accumulated data set by way of transferring source data sets, in sets of tracks of data by fast replication, to the accumulated data set.

7. A method of replicating data, comprising the steps of:
receiving at least a first backup request from a first of a plurality of host computers and a second backup request from a second of said plurality of host computers, wherein said first backup request requests a first source data set to be backed up and said second backup request requests a second source data set to be backed up;
creating an accumulated data set;
copying at least said first source data set and said second source data set to the accumulated data set such that the accumulated data set includes at least said first source data set and said second source data set;
calculating index information corresponding to at least said first source data set and said second source data set copied to the accumulated data set;
creating an index data set;
copying the index information to the index data set;
transmitting the accumulated data set to at least said first of said plurality of host computers and said second of said plurality of host computers, such that each of said plurality of host computers requesting backup receives the entire accumulated data set; and transmitting the index data set to at least said first of said plurality of host computers and said second of said plurality of host computers such that each of said plurality of host computers requesting backup receives the entire index data set.

8. The method of claim 7, wherein the index information includes an index key.

9. The method of claim 7, wherein the index information includes information useful to restore at least said first source data set or said second source data set from the accumulated data set.

10. The method of claim 7, further comprising the steps of calculating header information associated with at least said first source data set and said second source data set copied to the accumulated data set and writing the header information to the accumulated data set.

11. An article of manufacture including a non-transitory data storage medium, said non-transitory data storage medium including a set of machine-readable instructions that are executable by a processing device to implement an algorithm, said algorithm comprising the steps of:
receiving at least a first backup request from a first of a plurality of host computers and a second backup request from a second of said plurality of host computers, wherein said first backup request requests a first source data set to be backed up and said second backup request requests a second source data set to be backed up;
creating an accumulated data set;
copying at least said first source data set and said second source data set to the accumulated data set such that the accumulated data set includes at least said first source data set and said second source data set;
calculating index information corresponding to at least said first source data set and said second source data set copied to the accumulated data set;
creating an index data set;
copying the index information to the index data set;
transmitting the accumulated data set to at least said first of said plurality of host computers and said second of said plurality of host computers, such that each of said plurality of host computers requesting backup receives the entire accumulated data set; and
transmitting the index data set to at least said first of said plurality of host computers and said second of said plurality of host computers such that each of said plurality of host computers requesting backup receives the entire index data set.

12. The article of manufacture of claim 11, wherein the index information includes an index key.

13. The article of manufacture of claim 11, wherein the index information includes information useful to restore at least said first source data set or said second source data set from the accumulated data set.

14. The article of manufacture of claim 11, further comprising the steps of calculating header information associated with at least said first source data set or said second source data set copied to the accumulated data set and writing the header information to the accumulated data set.

15. A method of providing a service for replicating data, comprising integrating computer-readable code into a computing system, wherein the computer-readable code in combination with the computing system is capable of performing the following steps:
receiving at least a first backup request from a first of a plurality of host computers and a second backup request from a second of said plurality of host computers, wherein said first backup request requests a first source data set to be backed up and said second backup request requests a second source data set to be backed up;
creating an accumulated data set;
copying at least said first source data set and said second source data set to the accumulated data set such that the accumulated data set includes at least said first source data set and said second source data set;
calculating index information corresponding to at least said first source data set and said second source data set copied to the accumulated data set;
creating an index data set;
copying the index information to the index data set;
transmitting the accumulated data set to at least said first of said plurality of host computers and said second of said plurality of host computers, such that each of said plurality of host computers requesting backup receives the entire accumulated data set; and
transmitting the index data set to at least said first of said plurality of host computers and said second of said plurality of host computers such that each of said plurality of host computers requesting backup receives the entire index data set.

16. The method of claim 15, wherein the index information includes an index key.

17. The method of claim 15, wherein the index information includes information useful to restore at least said first source data set or said second source data set from the accumulated data set.

18. The method of claim 15, further comprising the steps of calculating header information associated with at least said first source data set or said second source data set copied to the accumulated data set and writing the header information to the accumulated data set.

* * * * *